United States Patent [19]

Naitoh

[11] 4,205,121
[45] May 27, 1980

[54] STORAGE COMPARTMENT
[75] Inventor: Yasuo Naitoh, Kamakura, Japan
[73] Assignee: Matsushita Electric Industrial Co., Ltd., Osaka, Japan
[21] Appl. No.: 962,189
[22] Filed: Nov. 20, 1978
[30] Foreign Application Priority Data
Nov. 25, 1977 [JP] Japan .......................... 52-158790[U]
[51] Int. Cl.² .............................................. H01M 2/10
[52] U.S. Cl. .................................... 429/99; 429/176; 206/333
[58] Field of Search ................................ 429/96–100, 429/176; 206/333, 499

[56] References Cited
U.S. PATENT DOCUMENTS

| 954,119 | 4/1910 | Mason | 429/99 X |
|---|---|---|---|
| 3,979,228 | 9/1976 | Marchetti | 429/99 |
| 4,125,681 | 11/1978 | Sjogren | 429/99 |

*Primary Examiner*—Charles F. LeFevour
*Attorney, Agent, or Firm*—Spencer & Kaye

[57] ABSTRACT

A battery storage compartment for selectively storing cylindrical batteries, such as dry cell batteries, or another battery of the type having a non-cylindrical end and a length different from that of said cylindrical batteries, such as a rechargeable battery. The battery storage compartment comprises a compartment member, spring means secured to one end wall of the compartment member, electrically conductive means located at the opposite end wall of the compartment and an abutment member attached to the compartment member at a location intermediate the opposite end walls and projecting from the bottom of the compartment member. The abutment member has cutout portions to accommodate the cylindrical dry cell batteries and spaced ribs which project toward the opposite end wall of the compartment member. When a rechargeable battery is placed in the storage compartment it is situated between the abutment member and the spring means.

10 Claims, 10 Drawing Figures

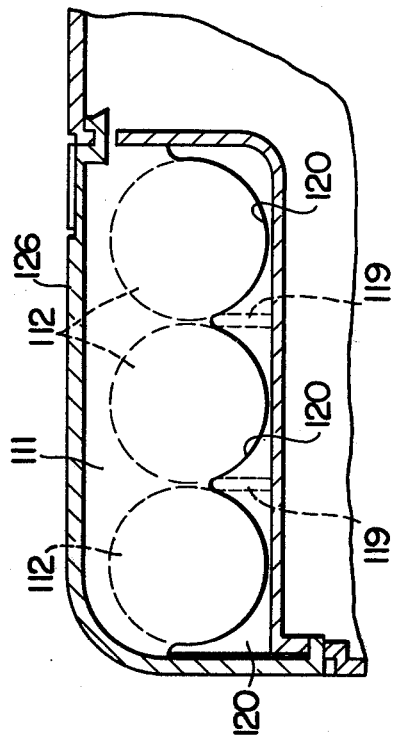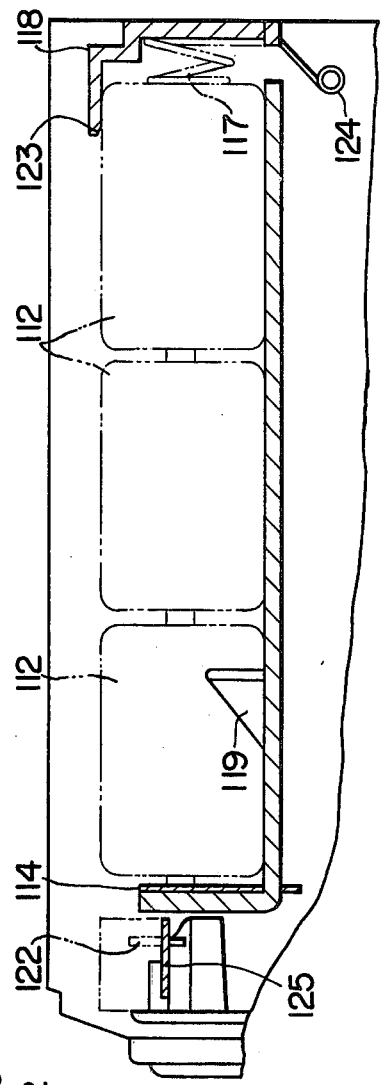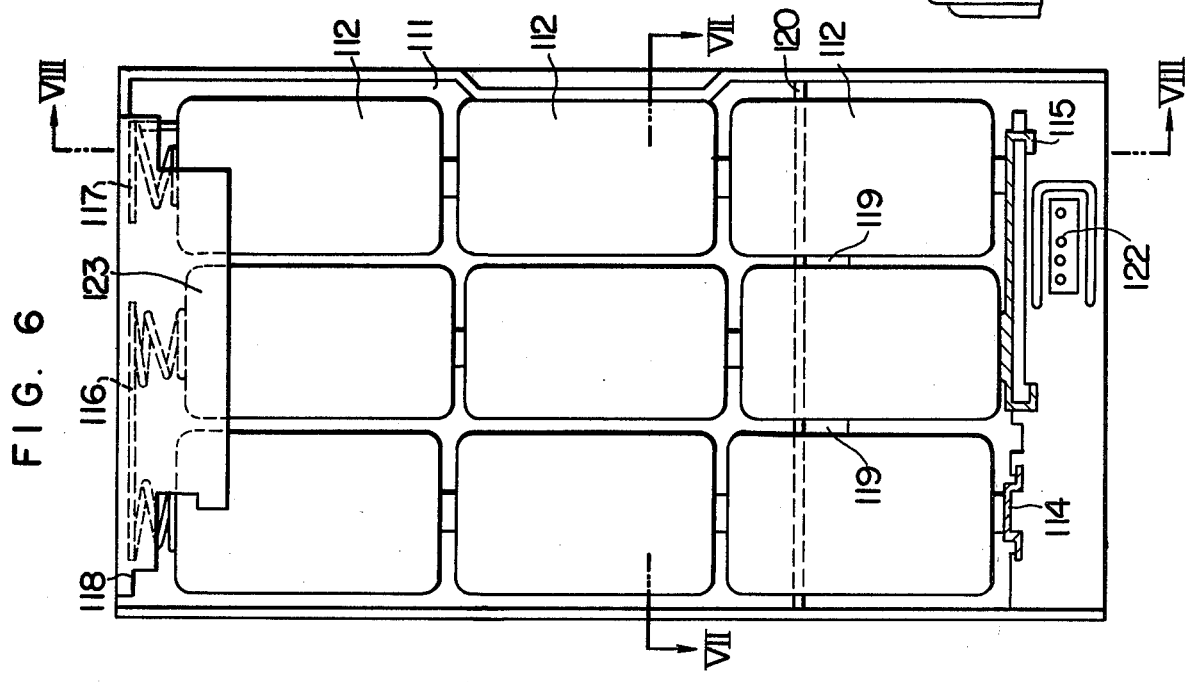

STORAGE COMPARTMENT

BACKGROUND OF THE INVENTION

Portable electronic products of various types are becoming increasingly popular. Many of these products use commercially available dry cell batteries which are discarded after a period of use during which the energy in such batteries is exhausted. The batteries then are replaced in order to permit continued ongoing use of the device in which they are placed. Obviously, this results in a continued expense for the purchase of the replacement batteries, as well as the inconvenience of removing the exhausted batteries and replacing them with new ones. In addition, the discarding of exhausted batteries and the continuing need to replace them with new batteries clearly is wasteful of natural resources.

Accordingly, rechargeable battery packs have been developed for use in place of discardable dry cell batteries in many portable electronic devices. Often, however, the external package configuration for a rechargeable battery pack which produces the same output power as the dry cell batteries is different from the space required for the dry cell batteries. Accordingly, a device often is made to accommodate one or the other, that is dry cell batteries or a rechargeable battery pack, but cannot accommodate both.

An alternative is to provide extra spacers or the like to enable the use of a smaller rechargeable battery pack in a battery storage compartment built to accommodate rows of dry cell batteries having an overall larger volume than the rechargeable battery pack. Another alternative is to build special shapes of rechargeable battery packs which have external dimensions approximating the overall external dimensions of the several dry cell batteries required to produce the comparable power output. These special shapes of rechargeable batteries, however, are generally higher in cost than conventional universal rechargeable battery packs, so that there is a significant cost disadvantage resulting from the necessity for using special rechargeable battery pack configurations customized to fit a particular compartment. Accordingly, it is desirable to provide a battery compartment for portable equipment which is able to alternatively accommodate several standard expendable dry cell batteries or a standard rechargeable battery pack of a smaller package size without any modifications of the compartment necessary to change from one to the other.

SUMMARY OF THE INVENTION

Accordingly it is an object of this invention to provide an improved storage compartment for objects.

It is another object of this invention to provide an improved storage compartment for objects of different lengths.

It is an additional object of this invention to provide an improved storage compartment for alternatively storing cylindrical objects or objects having at least one noncylindrical end space and being of a different length than cylindrical objects to be stored in the compartment.

It is a further object of this invention to provide an improved battery storage compartment.

In accordance with a preferred embodiment of this invention, a storage compartment for alternatively storing cylindrical objects or other objects having at least a noncylindrical end face, and being of different length than the cylindrical objects, includes a compartment which has at least a bottom and first and second end walls. Cylindrical objects are stored in the compartment with their axis extending between the first and second end walls; and an abutment member is attached to the compartment in a location which is intermediate to the first and second end walls. The abutment member has an opening in it to permit the cylindrical objects to pass through the opening without interference. The abutment member, however, engages the noncylindrical end face of other objects which alternatively may be stored in the compartment; so that such other objects are stored in the compartment; so that such other objects are stored between the abutment member and such one of said of the first and second end walls.

BRIEF DESCRIPTION OF THE DRAWINGS

FIG. 6 illustrates a preferred embodiment of the invention, showing the placement of expendable dry cell batteries therein.

FIG. 7 is a cross-sectional view taken along the lines VII—VII of FIG. 6.

FIG. 8 is a cross-sectional view taken along the lines VIII—VIII of FIG. 6.

DETAILED DESCRIPTION OF THE PREFERRED EMBODIMENT

The apparatus of this invention is related to battery storage devices of the type used in electronic units which drive television picture receivers, etc., by means of dry cell batteries or rechargeable batteries. In accordance with the preferred embodiment of the invention, a single battery storage compartment is made which is capable of holding a rechargeable battery or a multi-battery dry cell group without any interference or change even when the multi-battery dry cell group and the rechargeable batteries differ in size and shape.

Figure 1:
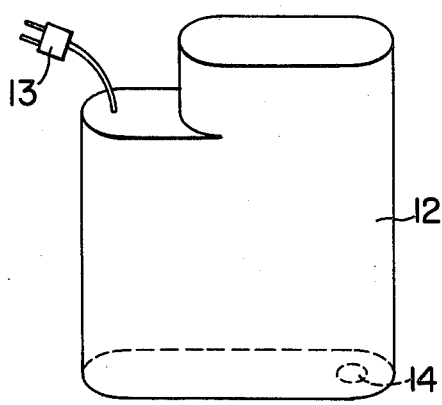
FIG. 1 is an illustration of the construction of a prior art rechargeable battery pack.
Figure 2:
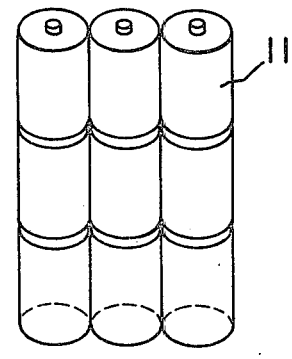
FIG. 2 illustrates a number of expendable dry cell batteries arranged for placement within a battery storage compartment.
Figure 3:
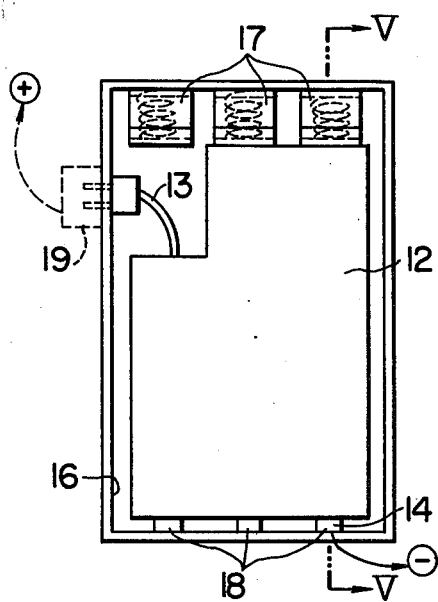
FIGS. 3 and 4 each illustrate a situation where the rechargeable battery of FIG. 1 or the dry cell batteries of FIG. 2 are arranged, respectively, in a prior art battery storage compartment.
Figure 4:
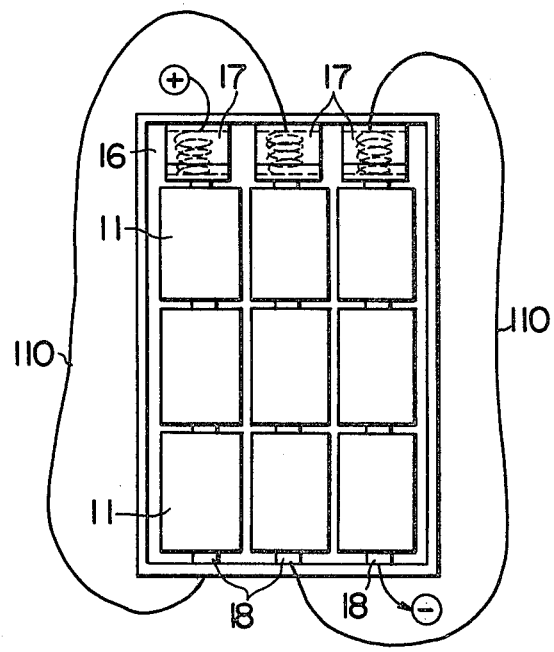
Figure 5:
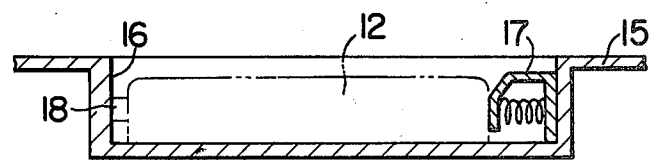
FIG. 5 is a cross-sectional view taken along the lines V—V of FIG. 3.

Previous devices used in the prior art are explained in conjunction with FIGS. 1 through 5. FIG. 1 represents a rechargeable battery 12, which is equivalent in size and shape to about eight standard dry cell batteries 11 as indicated in FIG. 2 (which shows in fact nine such batteries). This battery 12 is arranged with a connector 13 which has a positive terminal and an open terminal; and in one portion of the main body of the battery 12, a negative terminal 14. The battery 12 produces an output which is equivalent to a series circuit of nine conventional dry cell batteries 11. A battery storage compartment 16 is formed inside a main body or cabinet 15 as indicated in FIGS. 3, 4 and 5. Three spring contact plates 17 are arranged along one end wall of the storage compartment 16; and on the opposite end wall arranged in the same way, are three contact terminals 18 for connection with the negative terminals of the dry cell batteries 11 (FIG. 2) or the negative terminal 14 of the battery 12 (FIG. 1). Also a positive terminal 19 is arranged to contact the connector 13 adjoining the storage compartment 16.

FIG. 3 represents a situation where the rechargeable battery 12 is stored in the storage compartment 16. When the connector 13 is contacted to the terminal 19, the negative terminal 14 is contacted to one of the contact terminals 18; and power then may be supplied from the battery 12 to a load. On the other hand, FIG. 4 illustrates the case where nine dry cell batteries 11 are used as the power supply, with the batteries 11 lined up in three parallel rows. The positive terminal of the batteries 11 contact the spring contact plates 17 while the negative terminals of the batteries contact the terminals 18; and through the use of the interconnecting leads 110, the nine dry cell batteries 11 are connected together in a direct series circuit between the positive and negative terminals shown in FIG. 4.

From the foregoing it can be seen that the apparatus which uses the battery compartment shown in FIGS. 3 and 4 may be driven by either the dry cell batteries 11 or the rechargeable batteries 12, but it is necessary that the rechargeable batteries 12 have much the same shape and size of nine conventional dry cell batteries 11 in order to accomplish this interchangeability. Because a special shape is required for the batteries 12, there is a high cost disadvantage.

In FIGS. 6 through 10, there is shown a preferred embodiment of a battery storage compartment, which does not have the disadvantages of requiring the same general shape and size for the rechargeable batteries as is used for the dry cell batteries which alternatively may be used in the compartment. In the device shown in FIGS. 6 through 10, a common cell storage compartment 111 may be used for storing both multiple groups of dry cell batteries or rechargeable batteries even though they differ in size and shape.

Reference now should be made specifically to the device illustrated in FIGS. 6 through 10.

In FIG. 6 is shown an example illustrating the use of a storage compartment member 111 having opposing end walls and a bottom portion extending therebetween in which nine dry cell batteries 112 are shown. Along one of the end walls is a conductive terminal 114, to which the positive pole of the end dry cell battery 112 in the first dry cell group (indicating three dry cells in a row in a direct series connection) is connected, and a conductive terminal 115 to which the negative side of the bottom dry cell battery 112 of the second dry cell group and the positive terminal of the bottom dry cell battery 112 of the third group of three dry cell batteries are contacted. On the opposite end wall (the wall at the top of FIG. 6) a bracket 118 is formed and has a conductive spring terminal 116 to which the negative pole or terminal of the upper battery of the first row of dry cell batteries and the positive terminal of the upper battery of the second row of batteries are electrically contacted by the springs (not numbered) electrically connected to the terminal 116. An additional spring terminal 117 is electrically connected by a spring to the uppermost battery of the third or right-hand row of batteries 112. In this fashion the nine dry cell batteries 112 are connected in a direct series circuit between the terminal 114 and the terminal 117.

A standard rechargeable battery 113 (see FIGS. 9 and 10) is equivalent in size and shape to six of the dry cell batteries 112. Therefore, in a normal compartment, it is impossible to store the rechargeable battery 113 in a storage compartment 111 which is large enough to store nine dry cell batteries 112 without providing additional buffers or fillers for the space not occupied by the rechargeable battery 113.

Figure 9:
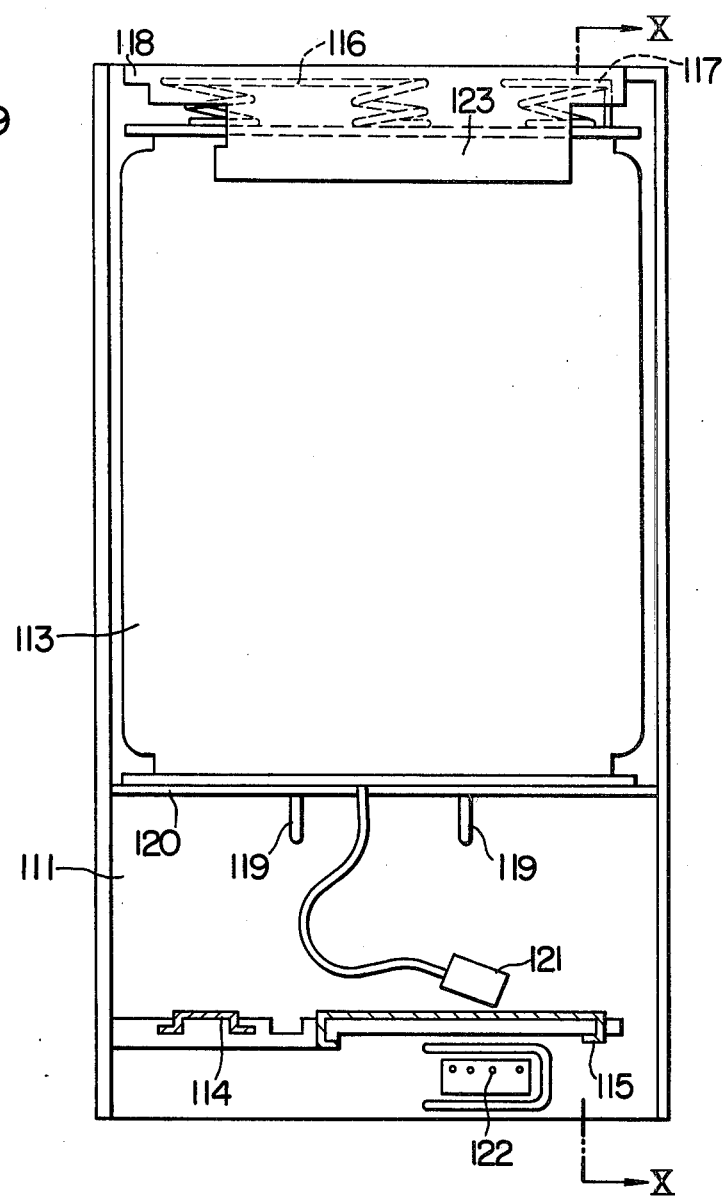
FIG. 9 shows the device of FIG. 6 with a rechargeable battery stored in it.
Figure 10:
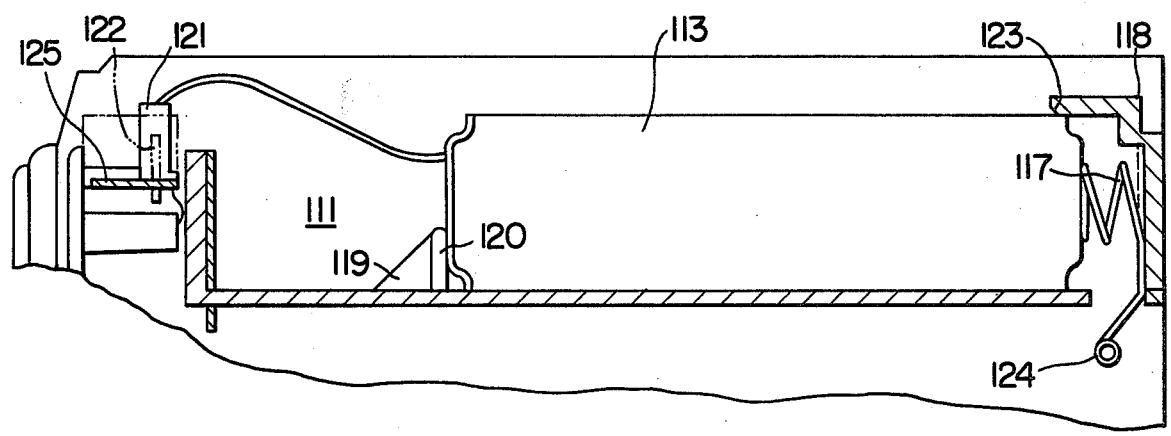
FIG. 10 is a cross-sectional view taken along the lines X—X of FIG. 9.

To overcome the problem of using a rechargeable battery 113 of the size shown in FIGS. 8, 9 and 10 in the compartment 111, an abutment member 120 is integrally joined to the bottom portion of the storage compartment 111 and arranged across the compartment 111 intermediate the two ends. The abutment 120 also has triangularly-shaped ribs 119 extending in a direction parallel to the rows of dry cell batteries 112 (see FIG. 6); and the abutment 120 has arcuate or arc-shaped cut-out portions in it to accommodate each of the three rows of dry cell batteries 112. This is shown most clearly in FIG. 7. Consequently, when the dry cell batteries 112 are stored, they can be placed in the compartment 111 precisely as shown in FIGS. 6 and 7 without any affect from the abutment 120 or the ribs 119.

When a rechargeable battery 113 is stored in the compartment 111, the battery 113 is held precisely between the abutment 120 (supported by the ribs 119) and the spring terminals 116 and 117. A terminal member 122 to which a connector 121 of the rechargeable battery 113 can be connected, is arranged next to the storage compartment 111 as shown in FIGS. 6, 8, 9 and 10. Therefore, by plugging the connector 121 into the terminal 122, it becomes possible to supply power from the rechargeable battery 113 to a load which may be connected in series between the terminal 122 and the negative terminal of the battery contacting the spring terminal 117. A retaining lip 123 is arranged as a part of the bracket 118 to hold down one end of the dry cell batteries 112 or one end of the battery 113 (as shown in FIGS. 6 and 9) against the base of the storage compartment 111 to prevent either of these types of batteries from popping out of the compartment.

As shown most clearly in FIGS. 8 and 10, a lead connection terminal 124 is electrically connected to the spring terminal 117 for connection to the load with which the battery storage compartment is used. A panel board or printed circuit board 125 supports the terminal 122 and a cover 126 (FIG. 7) in the form of a removable lid is used to cover the compartment 111 once the batteries 112 or the rechargeable battery 113 is placed in the compartment.

In the preferred embodiment of the invention described above, reference is made to the use of nine dry cell batteries 112; but it will be readily apparent to those skilled in the art that it is possible to use a smaller number of dry cell batteries or a different configuration from the one shown without departing from the scope of the invention. The invention makes it possible to use multi-battery dry cell groups and rechargeable batteries differing in overall size and shape, as well as to use miniaturized batteries in a common storage compartment by forming the dry cell storage compartment with an abutment having arc-shaped indentations into which the dry cell batteries can fit, while the abutment serves to hold one side of a smaller rechargeable battery between it and spring loaded terminals at the other end of the compartment.

I claim:

1. A battery storage compartment for selectively storing cylindrical batteries or another battery of the type having a non-cylindrical end and a length different from that of said cylindrical batteries, said battery storage compartment comprising:
   a compartment member having first and second opposite end walls and a bottom portion interposed therebetween;
   electrically conductive spring means secured to said first end wall and extending toward said second end wall;
   electrically conductive means located at said second end wall; and
   an abutment member attached to said compartment member projecting from said bottom portion at a location intermediate said first and second end walls and extending in a direction parallel thereto, said abutment member having a cutout portion therein and spaced rib members extending toward said second end wall;
   said cylindrical batteries, when stored, fitting within the cutout portions of said abutment member and between said spaced rib members in electrical contact with said spring means, said cylindrical batteries being urged by said spring means toward said electrically conductive means; said another battery, when stored, having its non-cylindrical end supported by said abutment means and its other end electrically connected to said spring means, said another battery being urged by said spring means and toward said abutment means.

2. A battery storage compartment according to claim 1, wherein said abutment member is integrally formed with the bottom of said compartment member.

3. A battery storage compartment according to claim 1, wherein the cutout portion in said abutment member defines at least one arcuate opening substantially conforming with the external circumference of cylindrical batteries stored in said storage compartment.

4. A battery storage compartment according to claim 3, wherein said compartment member accommodates the storage of at least two parallel rows of cylindrical batteries, and said abutment member has two of said arcuate openings therethrough for conforming to the external circumferences of said cylindrical batteries stored therein in said rows to permit said batteries to pass through said openings without interference.

5. A battery storage compartment according to claim 4, wherein said rib member is attached to said abutment member between the arcuate openings therein and extends parallel to the axes of the cylindrical batteries stored in said compartment member.

6. A battery storage compartment according to claim 5 wherein the distance between said first and second end walls is substantially equal to the axial length of an integral number of cylindrical batteries and the distance between said first end wall and said abutment member is substantially equal to the length of said another battery, the cutout portion of said abutment member being smaller than the end dimension of said another battery to permit said another battery to be supported between said abutment member and said first end wall.

7. A battery storage compartment according to claim 6, wherein said abutment member is integrally formed with said bottom of said compartment member.

8. A battery storage compartment according to claim 6 wherein said cylindrical batteries are dry cell batteries and said another battery is a rechargeable battery pack.

9. A battery storage compartment according to claim 1 wherein said electrically conductive means includes conductive terminals for contacting said cylindrical batteries, when stored, and a terminal member for making an electrical connection to said another battery, when stored.

10. A battery storage compartment according to claim 1 which further comprises means attached to said first end wall for retaining said cylindrical batteries or said another battery within said compartment member.